United States Patent
Hoshino et al.

(10) Patent No.: US 12,352,193 B2
(45) Date of Patent: Jul. 8, 2025

(54) DUMP TRUCK

(71) Applicant: Komatsu Ltd., Tokyo (JP)

(72) Inventors: Yuta Hoshino, Tokyo (JP); Hidetoshi Namai, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 18/266,617

(22) PCT Filed: Feb. 15, 2022

(86) PCT No.: PCT/JP2022/005914
§ 371 (c)(1),
(2) Date: Jun. 12, 2023

(87) PCT Pub. No.: WO2022/181390
PCT Pub. Date: Sep. 1, 2022

(65) Prior Publication Data
US 2024/0102413 A1    Mar. 28, 2024

(30) Foreign Application Priority Data
Feb. 25, 2021  (JP) .................... 2021-028699

(51) Int. Cl.
*F01N 13/18*  (2010.01)
*B60K 13/04*  (2006.01)
*B60P 1/28*  (2006.01)
*F01N 13/00*  (2010.01)

(52) U.S. Cl.
CPC .......... *F01N 13/1805* (2013.01); *B60K 13/04* (2013.01); *B60P 1/28* (2013.01); *F01N 13/011* (2014.06)

(58) Field of Classification Search
CPC ...... F01N 13/1805; F01N 3/24; F01N 3/2066; F01N 3/021; F01N 13/011; F01N 2340/04; B60P 1/28; B60K 13/04
See application file for complete search history.

(56) References Cited

U.S. PATENT DOCUMENTS

| 9,828,743 | B2 * | 11/2017 | Nakano ................. B60K 13/04 |
| 2014/0156175 | A1 | 6/2014 | Young et al. |
| 2014/0326527 | A1 | 11/2014 | Harada et al. |
| 2015/0000256 | A1 | 1/2015 | Kobayashi et al. |

(Continued)

FOREIGN PATENT DOCUMENTS

| DE | 112013004327 T5 * | 9/2015 | ............ F01N 13/00 |
| JP | 2011004703 A * | 1/2011 | |

(Continued)

OTHER PUBLICATIONS

English Translation JP 20114703 (Year: 2011).*

*Primary Examiner* — Anthony Ayala Delgado
(74) *Attorney, Agent, or Firm* — Troutman Pepper Locke LLP

(57) ABSTRACT

A dump truck includes an engine, a cab floor disposed above the engine and configured to support a cab, a first aftertreatment device configured to treat exhaust gas discharged from a first exhaust pipe of the engine, and a second aftertreatment device configured to treat exhaust gas discharged from a second exhaust pipe of the engine. The first aftertreatment device and the second aftertreatment device are disposed side by side in a vehicle width direction behind the engine and below the cab floor.

13 Claims, 5 Drawing Sheets

(56) References Cited

U.S. PATENT DOCUMENTS

2017/0284274 A1    10/2017   Kanayama et al.
2018/0087477 A1    3/2018   Kamoshida et al.
2021/0221274 A1    7/2021   Tanaka et al.

FOREIGN PATENT DOCUMENTS

| JP | 2014-122476 A | 7/2014 | |
|----|---|---|---|
| JP | 2015-105652 A | 6/2015 | |
| JP | 2015-112907 A | 6/2015 | |
| WO | 2014/007060 A1 | 1/2014 | |
| WO | 2016/163300 A1 | 10/2016 | |
| WO | 2017/034043 A1 | 3/2017 | |
| WO | WO-2017065117 A1 * | 4/2017 | ............ A01D 41/02 |
| WO | 2018/216824 A1 | 11/2018 | |

\* cited by examiner

FIG.1
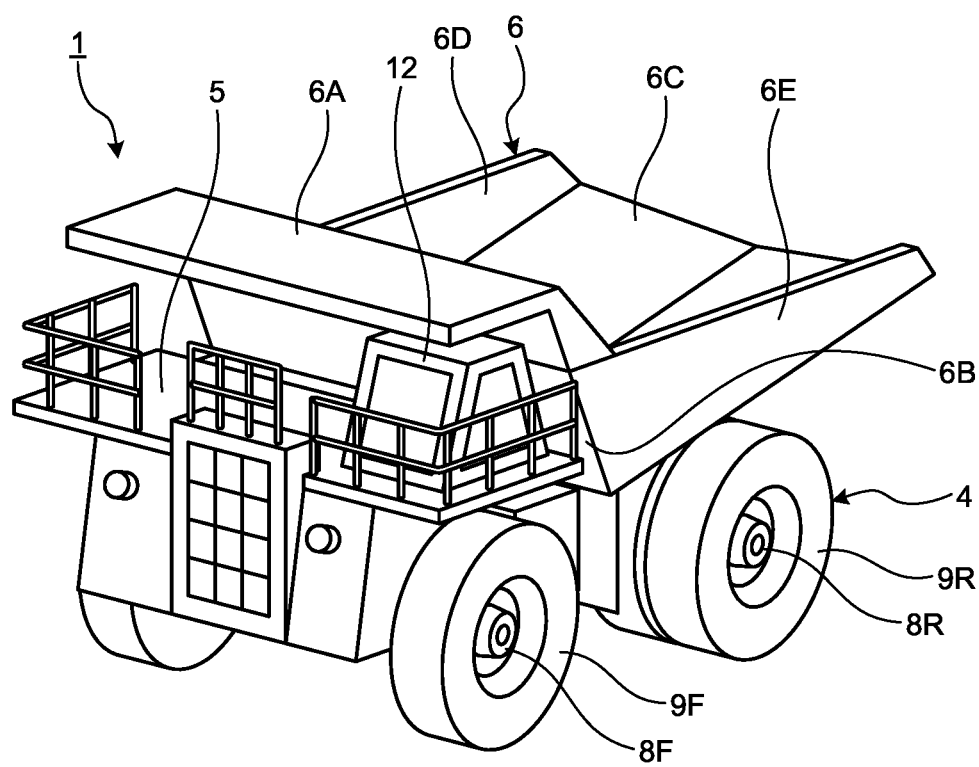
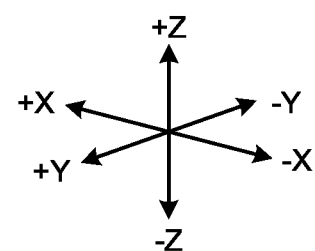

DUMP TRUCK

FIELD

The present disclosure relates to a dump truck.

BACKGROUND

As an aftertreatment device for exhaust gas discharged from an engine, an aftertreatment device as disclosed in Patent Literature 1 is known.

CITATION LIST

Patent Literature

Patent Literature 1: WO 2014/007060 A

SUMMARY

Technical Problem

When an aftertreatment device is installed in a dump truck, it may be difficult to install the aftertreatment device in an engine room due to restriction of an installation space. When the aftertreatment device is installed outside the engine room, a visual field of a driver may be obstructed depending on the position of the aftertreatment device.

An object of the present disclosure is to dispose an aftertreatment device for exhaust gas at an appropriate position of a dump truck.

Solution to Problem

According to an aspect of the present invention, a dump truck comprises: an engine; a cab floor disposed above the engine and configured to support a cab; a first aftertreatment device configured to treat exhaust gas discharged from a first exhaust pipe of the engine; and a second aftertreatment device configured to treat exhaust gas discharged from a second exhaust pipe of the engine, wherein the first aftertreatment device and the second aftertreatment device are disposed side by side in a vehicle width direction behind the engine and below the cab floor.

Advantageous Effects of Invention

According to the present disclosure, an aftertreatment device for exhaust gas is disposed at an appropriate position of a dump truck.

BRIEF DESCRIPTION OF DRAWINGS

FIG. 1 is a front perspective view schematically illustrating a dump truck according to an embodiment.

DESCRIPTION OF EMBODIMENTS

Hereinafter, embodiments according to the present disclosure will be described with reference to the drawings, but the present disclosure is not limited to the embodiments. The components of the embodiments described below can be appropriately combined. In addition, some components may not be used.

In the embodiment, a three-dimensional orthogonal coordinate system is set, and a positional relationship of each part will be described with reference to the three-dimensional orthogonal coordinate system. A direction parallel to an X-axis in a predetermined plane is defined as an X-axis direction, a direction parallel to a Y-axis in a predetermined plane orthogonal to the X-axis is defined as a Y-axis direction, and a direction parallel to a Z-axis orthogonal to the predetermined plane is defined as a Z-axis direction. In the embodiment, the XY plane and the horizontal plane are parallel.

The X-axis direction indicates the left-and-right direction. The Y-axis direction indicates the forward-and-rearward direction. The Z-axis direction indicates the upward-and-downward direction. The left-and-right direction refers to a direction parallel to the rotation axis of non-steered wheels of a dump truck, and is synonymous with the vehicle width direction. The upward-and-downward direction refers to a direction orthogonal to the contact surface of the tire of the dump truck that contacts the ground. The forward-and-rearward direction refers to a direction orthogonal to the left-and-right direction and the upward-and-downward direction. The +X direction is a right direction, and the −X direction is a left direction. The +Y direction is a forward direction and the −Y direction is a rearward direction. The +Z direction is an upward direction, and the −Z direction is a downward direction.

[Dump Truck]

Figure 2:
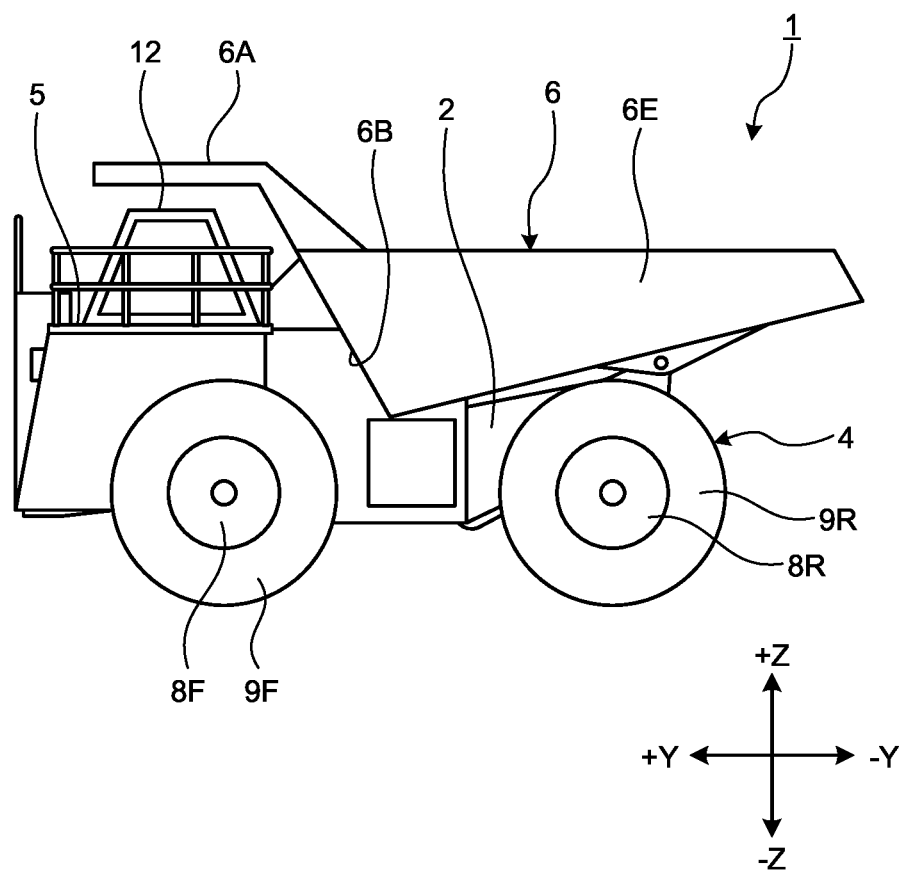
FIG. 2 is a left side view schematically illustrating the dump truck according to the embodiment.
Figure 3:
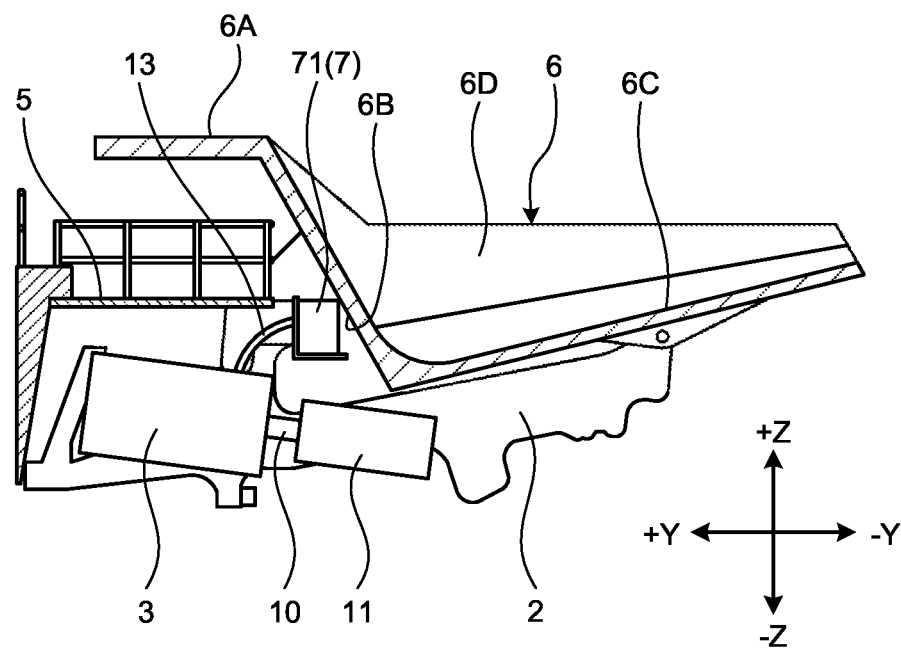
FIG. 3 is a side cross-sectional view illustrating a part of the dump truck according to the embodiment.

FIG. 1 is a front perspective view schematically illustrating a dump truck 1 according to an embodiment. FIG. 2 is a left side view schematically illustrating the dump truck 1 according to the embodiment. FIG. 3 is a side cross-sectional view illustrating a part of the dump truck 1 according to the embodiment.

The dump truck 1 is a self-propelled off-road dump truck that operates at a mining site of a mine. The dump truck 1 is a rigid frame type.

As illustrated in FIGS. 1, 2, and 3, the dump truck 1 includes a vehicle body frame 2, an engine 3, a traveling device 4, a cab floor 5, a dump body 6, and an aftertreatment device 7.

The vehicle body frame 2 supports each of the engine 3, the cab floor 5, and the dump body 6.

The engine 3 is a power source of the dump truck 1. The engine 3 is supported on the front portion of the vehicle body frame 2. The engine 3 is a diesel engine. The engine 3 burns fuel to generate power. Exhaust gas is discharged from the engine 3.

The traveling device 4 travels while supporting the vehicle body frame 2. The traveling device 4 has a front axle 8F and a rear axle 8R. A front tire 9F is mounted on the front axle 8F. A rear tire 9R is mounted on the rear axle 8R. The front axle 8F is operated by a steering device of the dump truck 1. The rear axle 8R is not steered. The X-axis direction is a direction parallel to the rotation axis of the rear axle 8R. The traveling device 4 is operated by the power generated by the engine 3. The engine 3 is connected to a transmission 11 via a power take-off 10. The power take-off 10 is disposed behind the engine 3. The transmission 11 is disposed behind the power take-off 10. The power generated by the engine 3 is transmitted to the rear tire 9R via the power take-off 10, the transmission 11, and the rear axle 8R. As the rear tires 9R rotate, the dump truck 1 travels.

The cab floor 5 is a plate-shaped member. The cab floor 5 is provided above the engine 3 and supported by a front portion of the vehicle body frame 2. The cab floor 5 is disposed above the engine 3. At least a part of the cab floor 5 is disposed above the front axle 8F (front tires 9F). The cab floor 5 supports a cab 12. The cab 12 is disposed on the left of the upper surface of the cab floor 5. A driver's cab is provided inside the cab 12. A driver gets on the driver's cab and drives the dump truck 1.

The dump body 6 loads a load. The dump truck 1 is of a rear dump type. The dump truck 1 discharges the load from the dump body 6 by rotating the dump body 6 rearwards.

The dump body 6 can change between a loading posture and a dumping posture by rotation. The loading posture refers to a posture in which the dump body 6 is lowered so as to be closest to the vehicle body frame 2 within a movable range of the dump body 6 and is seated on the vehicle body frame 2. The dumping posture refers to a posture in which the dump body 6 is raised to be the farthest from the vehicle body frame 2 in the movable range of the dump body 6. In the loading posture of the dump body 6, a load is loaded on the dump body 6, and the dump truck 1 can travel. When the dump body 6 is in the dumping posture, the load is discharged from the dump body 6.

The dump body 6 includes a protector plate 6A, a front plate 6B, a bottom plate 6C, a right side plate 6D, and a left side plate 6E. When the dump body 6 is in the loading posture, the protector plate 6A is disposed above the cab 12. The front plate 6B is connected to the rear end portion of the protector plate 6A. The rear end portion of the protector plate 6A and the upper end portion of the front plate 6B are connected. The bottom plate 6C is connected to the lower end portion of the front plate 6B. The lower end portion of the front plate 6B and the front end portion of the bottom plate 6C are connected. The right side plate 6D is connected to each of the right end portion of the front plate 6B and the right end portion of the bottom plate 6C. The left side plate 6E is connected to each of the left end portion of the front plate 6B and the left end portion of the bottom plate 6C. The protector plate 6A, the front plate 6B, the bottom plate 6C, the right side plate 6D, and the left side plate 6E are formed to be integrated.

[Aftertreatment Device]

Figure 4:
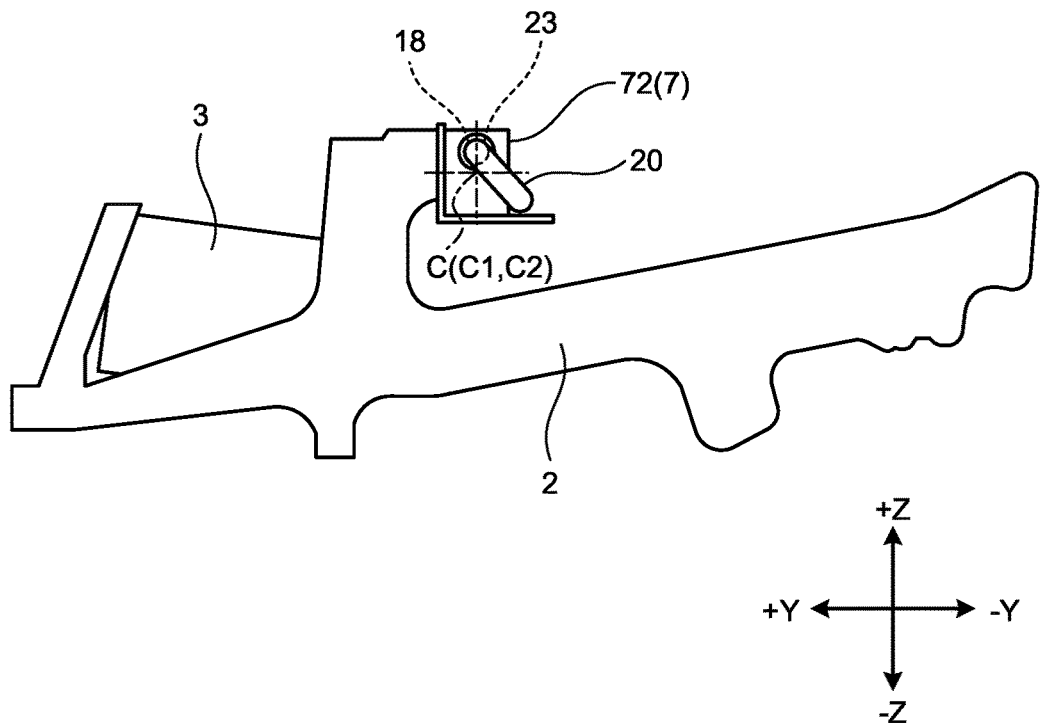
FIG. 4 is a left side view illustrating a vehicle body frame, an engine, and an aftertreatment device according to the embodiment.
Figure 5:
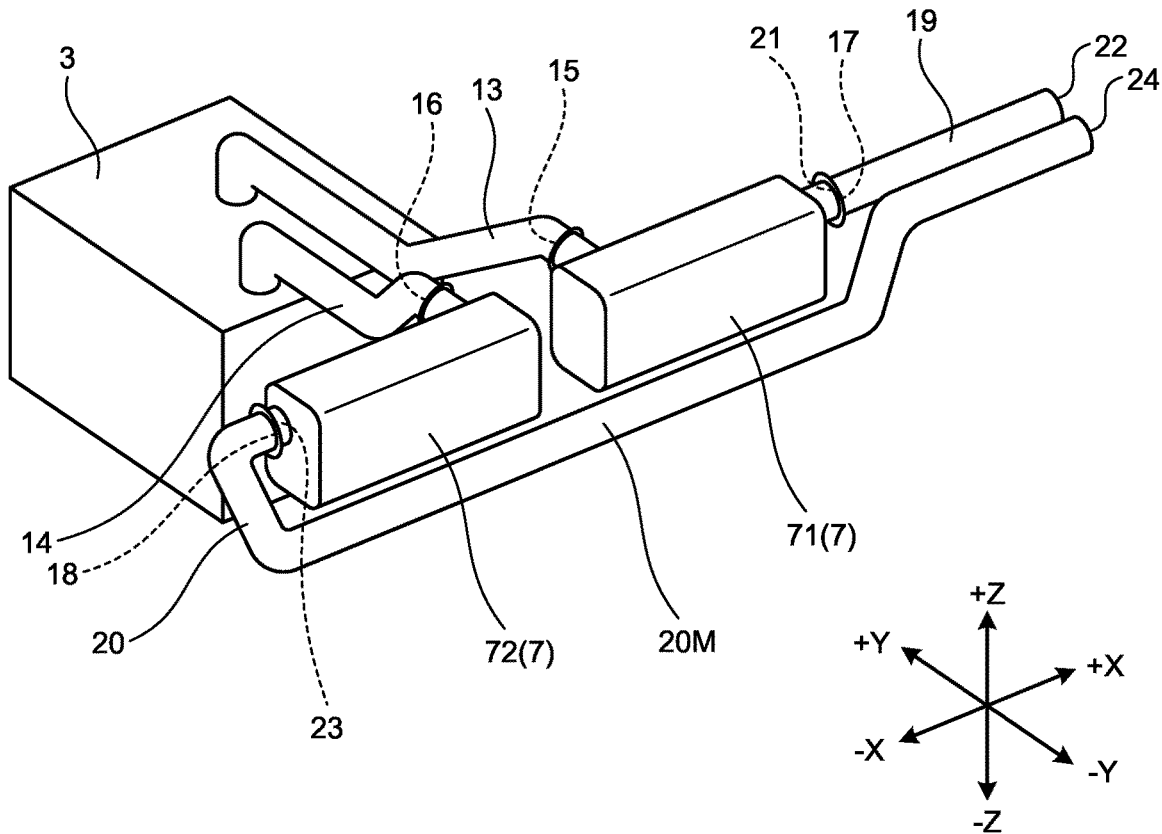
FIG. 5 is a rear perspective view illustrating the engine and the aftertreatment device according to the embodiment.
Figure 6:
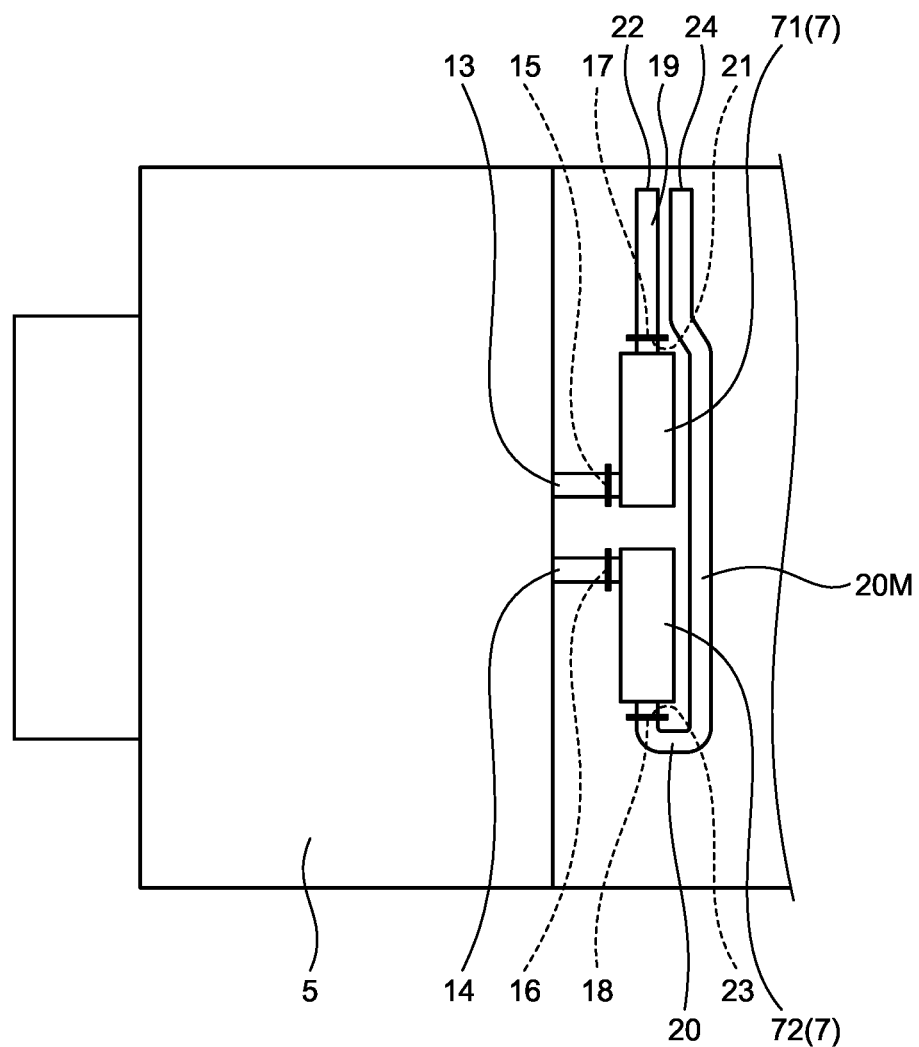
FIG. 6 is a plan view illustrating a relationship between a cab floor and the aftertreatment device according to the embodiment.
Figure 7:
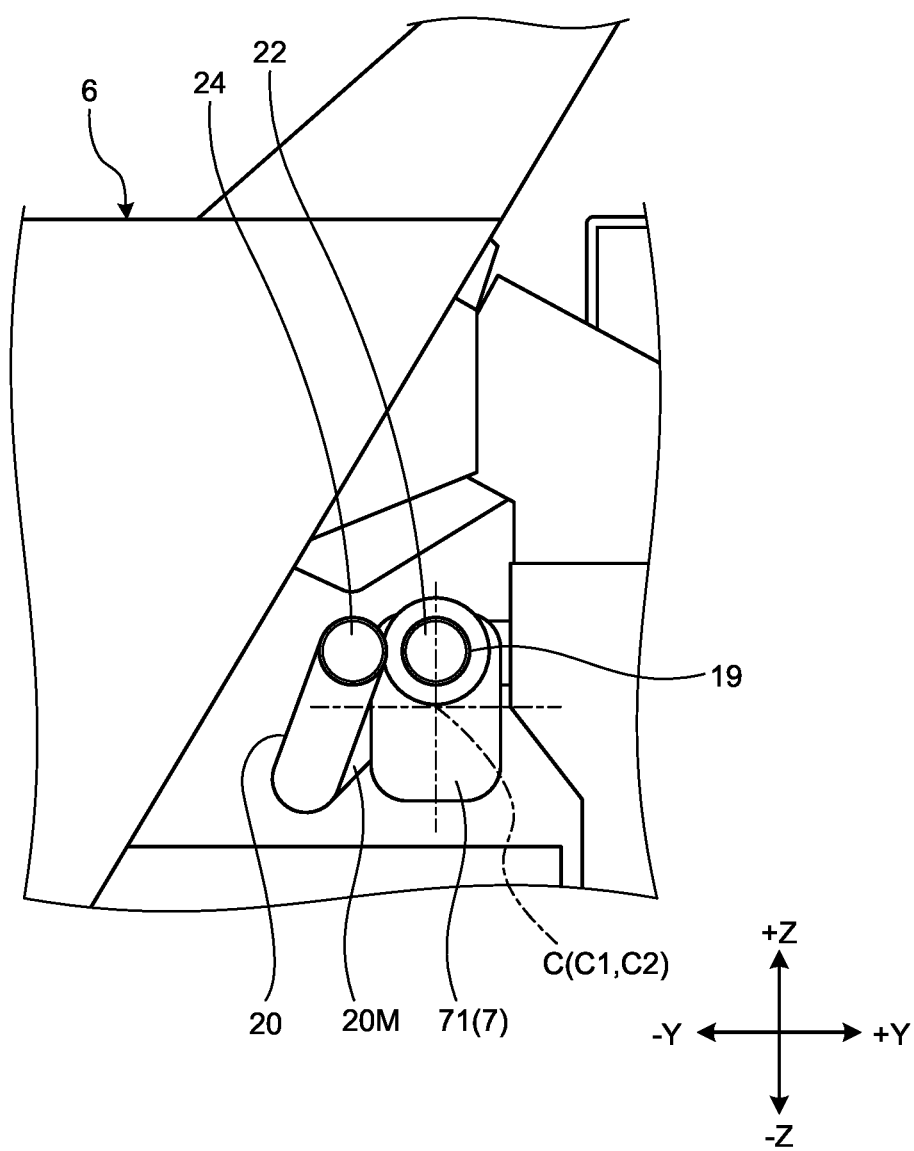
FIG. 7 is a right side view illustrating the aftertreatment device according to the embodiment.

FIG. 4 is a left side view illustrating the vehicle body frame 2, the engine 3, and the aftertreatment device 7 according to the embodiment. FIG. 5 is a rear perspective view illustrating the engine 3 and the aftertreatment device 7 according to the embodiment. FIG. 6 is a plan view illustrating a relationship between the cab floor 5 and the aftertreatment device 7 according to the embodiment. FIG. 7 is a right side view illustrating the aftertreatment device 7 according to the embodiment.

The aftertreatment device 7 treats exhaust gas discharged from the engine 3. The aftertreatment device 7 purifies the exhaust gas. In the embodiment, the aftertreatment device 7 includes a urea selective catalytic reduction (SCR) system configured to reduce and purify nitrogen oxides (NOx) contained in the exhaust gas using a selective catalyst and a reducing agent.

In the embodiment, the aftertreatment device 7 includes a first aftertreatment device 71 and a second aftertreatment device 72. As illustrated in FIGS. 3, 4, 5, 6, and 7, the first aftertreatment device 71 and the second aftertreatment device 72 are disposed side by side in the vehicle width direction (left-and-right direction) behind the engine 3 and below the cab floor 5. In the embodiment, the first aftertreatment device 71 is disposed on the right of the second aftertreatment device 72.

In the upward-and-downward direction, each of the first aftertreatment device 71 and the second aftertreatment device 72 is disposed above the engine 3. In the upward-and-downward direction, each of the first aftertreatment device 71 and the second aftertreatment device 72 is disposed below the cab floor 5. In the embodiment, each of the first aftertreatment device 71 and the second aftertreatment device 72 is disposed above at least one of the power take-off 10 and the transmission 11. In the forward-and-rearward direction, each of the first aftertreatment device 71 and the second aftertreatment device 72 is disposed behind the engine 3. In the forward-and-rearward direction, each of the first aftertreatment device 71 and the second aftertreatment device 72 is disposed behind the cab floor 5. When the dump body 6 is in the loading posture, each of the first aftertreatment device 71 and the second aftertreatment device 72 is disposed in front of the front plate 6B of the dump body 6.

The first aftertreatment device 71 and the second aftertreatment device 72 are the same type of urea SCR system. The performance of the first aftertreatment device 71 is equal to the performance of the second aftertreatment device 72. The outer shape of the first aftertreatment device 71 is equal to the outer shape of the second aftertreatment device 72. The dimension of the outer shape of the first aftertreatment device 71 is equal to the dimension of the outer shape of the second aftertreatment device 72. The outer shape of the first aftertreatment device 71 is long in a predetermined direction. The outer shape of the second aftertreatment device 72 is long in a predetermined direction. The outer shape of the first aftertreatment device 71 and the outer shape of the second aftertreatment device 72 may be substantially cylindrical or other shapes.

The first aftertreatment device 71 is disposed on the vehicle body frame 2 so that the longitudinal direction of the first aftertreatment device 71 coincides with the vehicle width direction of the dump truck 1. The second aftertreatment device 72 is disposed on the vehicle body frame 2 so that the longitudinal direction of the second aftertreatment device 72 coincides with the vehicle width direction of the dump truck 1.

In the embodiment, each of the first aftertreatment device 71 and the second aftertreatment device 72 is attachable to and detachable from the vehicle body frame 2.

In the forward-and-rearward direction, the position of the first aftertreatment device 71 is substantially equal to the position of the second aftertreatment device 72. In the upward-and-downward direction, the position of the first aftertreatment device 71 is substantially equal to the position of the second aftertreatment device 72.

The right end portion of the first aftertreatment device 71 is disposed to the left of the right end portion of the dump body 6. The left end portion of the second aftertreatment device 72 is disposed to the right of the left end portion of the dump body 6. That is, each of the first aftertreatment device 71 and the second aftertreatment device 72 does not protrude outwards from the dump body 6 in the left-and-right direction.

In the embodiment, the engine 3 is a V-type 12 cylinder engine. The engine 3 has a plurality of right cylinders and a plurality of left cylinders. The right cylinder and the left cylinder are alternately disposed in the forward-and-rearward direction. Further, the engine 3 is a so-called vertical engine. That is, the crankshaft of the engine 3 is long in the forward-and-rearward direction. Six right cylinders are provided in the forward-and-rearward direction. Six left cylinders are provided in the forward-and-rearward direction. In the engine 3, a discharge port (not illustrated) configured to discharge the exhaust gas discharged from the right cylinder and the left cylinder to the outside of the engine 3 is disposed.

Each of the plurality of right cylinders is connected to a first exhaust pipe 13 via the discharge port. Each of the plurality of left cylinders is connected to a second exhaust pipe 14 via the discharge port. The exhaust gas discharged from the right cylinder is discharged to the first exhaust pipe 13 via the discharge port. The exhaust gas discharged from the left cylinder is discharged to the second exhaust pipe 14 via the discharge port.

The first aftertreatment device 71 is connected to the first exhaust pipe 13. The first aftertreatment device 71 treats the exhaust gas discharged from the first exhaust pipe 13 of the engine 3. The second aftertreatment device 72 is connected to the second exhaust pipe 14. The second aftertreatment device 72 treats the exhaust gas discharged from the second exhaust pipe 14 of the engine 3.

The first exhaust pipe 13 is connected to an intake port 15 of the first aftertreatment device 71. The intake port 15 is provided in the left portion of the front portion of the first aftertreatment device 71. The second exhaust pipe 14 is connected to an intake port 16 of the second aftertreatment device 72. The intake port 16 is provided in the right portion of the front portion of the second aftertreatment device 72.

The exhaust gas discharged from the engine 3 and flowing into the intake port 15 of the first aftertreatment device 71 via the first exhaust pipe 13 is purified by the first aftertreatment device 71, and then discharged from an exhaust port 17 of the first aftertreatment device 71. The exhaust gas discharged from the engine 3 and flowing into the intake port 16 of the second aftertreatment device 72 via the second exhaust pipe 14 is purified by the second aftertreatment device 72, and then discharged from an exhaust port 18 of the second aftertreatment device 72.

The exhaust port 17 of the first aftertreatment device 71 is provided on the right side portion of the first aftertreatment device 71. The exhaust port 18 of the second aftertreatment device 72 is provided on the left side portion of the second aftertreatment device 72.

The exhaust port 17 of the first aftertreatment device 71 is connected to a third exhaust pipe 19. The exhaust port 18 of the second aftertreatment device 72 is connected to a fourth exhaust pipe 20.

The third exhaust pipe 19 has an inlet 21 and an outlet 22. The inlet 21 is provided at one end portion of the third exhaust pipe 19. The outlet 22 is provided at the other end portion of the third exhaust pipe 19. The exhaust port 17 of the first aftertreatment device 71 and the inlet 21 of the third exhaust pipe 19 are connected. The exhaust gas discharged from the exhaust port 17 of the first aftertreatment device 71 flows through the third exhaust pipe 19 and then flows out from the outlet 22 of the third exhaust pipe 19.

The fourth exhaust pipe 20 has an inlet 23 and an outlet 24. The inlet 23 is provided at one end portion of the fourth exhaust pipe 20. The outlet 24 is provided at the other end portion of the fourth exhaust pipe 20. The exhaust port 18 of the second aftertreatment device 72 and the inlet 23 of the fourth exhaust pipe 20 are connected. The exhaust gas discharged from the exhaust port 18 of the second aftertreatment device 72 flows through the fourth exhaust pipe 20 and then flows out from the outlet 24 of the fourth exhaust pipe 20.

In the embodiment, each of the outlet 22 of the third exhaust pipe 19 and the outlet 24 of the fourth exhaust pipe 20 is disposed on the right side of the first aftertreatment device 71. The exhaust gas of the engine 3 is discharged to the right of the dump truck 1 from each of the outlet 22 of the third exhaust pipe 19 and the outlet 24 of the fourth exhaust pipe 20.

In the upward-and-downward direction, at least a part of the fourth exhaust pipe 20 is disposed below a center C1 of the first aftertreatment device 71 and a center C2 of the second aftertreatment device 72. In the embodiment, the center C (C1, C2) of the first and second aftertreatment devices 71 and 72 refers to substantially the center of the first and second aftertreatment devices 71 and 72 in the upward-and-downward direction and the forward-and-rearward direction. In the embodiment, the fourth exhaust pipe 20 includes an intermediate part 20M disposed behind the first aftertreatment device 71 and the second aftertreatment device 72. The intermediate part 20M of the fourth exhaust pipe 20 is disposed below the center C1 of the first aftertreatment device 71 and the center C2 of the second aftertreatment device 72 in the upward-and-downward direction.

As illustrated in FIG. 7, the position of the outlet 22 of the third exhaust pipe 19 coincides with the position of at least a part of the outlet 24 of the fourth exhaust pipe 20. That is, the height of the outlet 22 of the third exhaust pipe 19 coincides with the height of at least a part of the outlet 24 of the fourth exhaust pipe 20. In the upward-and-downward direction, the outlet 22 of the third exhaust pipe 19 and the outlet 24 of the fourth exhaust pipe 20 are disposed above the center C1 of the first aftertreatment device 71 and the center C2 of the second aftertreatment device 72, respectively.

Each of the right end portion (outlet 22) of the third exhaust pipe 19 and the right end portion (outlet 24) of the fourth exhaust pipe 20 is disposed to the left of the right end portion of the dump body 6. Each of the left end portion of the third exhaust pipe 19 and the left end portion of the fourth exhaust pipe 20 is disposed to the right of the left end portion of the dump body 6. That is, each of the third exhaust pipe 19 and the fourth exhaust pipe 20 does not protrude outwards from the dump body 6 in the left-and-right direction.

[Effects]

As described above, according to the embodiment, the first aftertreatment device 71 and the second aftertreatment device 72 are disposed side by side in the vehicle width direction behind the engine 3 and below the cab floor 5. According to the embodiment, since the first aftertreatment device 71 and the second aftertreatment device 72 are disposed behind the engine 3, the same are not installed in the engine room. The first aftertreatment device 71 and the second aftertreatment device 72 are disposed below the cab floor 5 and thus do not obstruct the visual field of the driver. Since the first aftertreatment device 71 and the second aftertreatment device 72 are disposed side by side in the vehicle width direction, a space behind the engine 3 and below the cab floor 5 is effectively used. As described above, the first aftertreatment device 71 and the second aftertreatment device 72 are disposed at appropriate positions of the dump truck 1.

Each of the first aftertreatment device 71 and the second aftertreatment device 72 is disposed in front of the front plate 6B of the dump body 6. As a result, a space behind the engine 3, below the cab floor 5, and in front of the front plate 6B is effectively used. Each of the first aftertreatment device 71 and the second aftertreatment device 72 is protected by the protector plate 6A and the front plate 6B.

The first aftertreatment device 71 is disposed so that the longitudinal direction of the first aftertreatment device 71 coincides with the vehicle width direction. The second aftertreatment device 72 is disposed so that the longitudinal direction of the second aftertreatment device 72 coincides with the vehicle width direction. As a result, the occupied space of the first aftertreatment device 71 and the second aftertreatment device 72 is suppressed from increasing.

The first aftertreatment device 71 is disposed on the right side of the second aftertreatment device 72. The exhaust port 17 of the first aftertreatment device 71 is provided on the right side portion of the first aftertreatment device 71. The exhaust port 18 of the second aftertreatment device 72 is provided on the left side portion of the second aftertreatment device 72. The outlet 22 of the third exhaust pipe 19 connected to the exhaust port 17 is disposed on the right side of the first aftertreatment device 71. The outlet 24 of the fourth exhaust pipe 20 connected to the exhaust port 18 is disposed on the right side of the first aftertreatment device 71. Since each of the outlet 22 of the third exhaust pipe 19 and the outlet 24 of the fourth exhaust pipe 20 is disposed on the right side of the first aftertreatment device 71, the exhaust gas is discharged to the right side of the dump truck 1. Since the cab 12 is disposed on the left side of the cab floor 5, a distance between the driver's cab and the outlets 22 and 24 becomes long. Therefore, it is possible to suppress noise generated when the exhaust gas is discharged from the outlet 22 and the outlet 24 from being transmitted to the driver's cab. In addition, the exhaust gas discharged from the outlet 22 and the outlet 24 is suppressed from flowing into the driver's cab.

In the upward-and-downward direction, at least a part of the fourth exhaust pipe 20 is disposed below the center C1 of the first aftertreatment device 71 and the center C2 of the second aftertreatment device 72. In the embodiment, the intermediate part 20M of the fourth exhaust pipe 20 is disposed below the center C1 of the first aftertreatment device 71 and the center C2 of the second aftertreatment device 72. As a result, contact between the fourth exhaust pipe 20 and at least a part of the dump body 6 is suppressed.

In the upward-and-downward direction, the position of the outlet 22 of the third exhaust pipe 19 coincides with the position of at least a part of the outlet 24 of the fourth exhaust pipe 20. Since the outlet 22 and the outlet 24 are disposed at the same height, it is possible to suppress an increase in occupied space of the third exhaust pipe 19 and the fourth exhaust pipe 20. If necessary, the outlet 22 of the third exhaust pipe 19 and the outlet 24 of the fourth exhaust pipe 20 can be connected by a manifold.

In the upward-and-downward direction, the outlet 22 of the third exhaust pipe 19 and the outlet 24 of the fourth exhaust pipe 20 are disposed above the center C1 of the first aftertreatment device 71 and the center C2 of the second aftertreatment device 72, respectively. Since the outlet 22 and the outlet 24 are disposed at the same height as the upper portion of the first aftertreatment device 71 and the upper portion of the second aftertreatment device 72, the occupied space of the third exhaust pipe 19 and the fourth exhaust pipe 20 is suppressed from increasing.

Each of the first aftertreatment device 71 and the second aftertreatment device 72 is attached to and detached from the vehicle body frame 2. Since each of the first aftertreatment device 71 and the second aftertreatment device 72 is supported by the vehicle body frame 2, a variation in the relative position between the first aftertreatment device 71 and the second aftertreatment device 72 and the vehicle body frame 2 is suppressed. Since each of the first aftertreatment device 71 and the second aftertreatment device 72 is removed from the vehicle body frame 2, maintainability of the first aftertreatment device 71 and the second aftertreatment device 72 is improved.

REFERENCE SIGNS LIST

1 DUMP TRUCK
2 VEHICLE BODY FRAME
3 ENGINE
4 TRAVELING DEVICE
5 CAB FLOOR
6 DUMP BODY
6A PROTECTOR PLATE
6B FRONT PLATE
6C BOTTOM PLATE
6D RIGHT SIDE PLATE
6E LEFT SIDE PLATE
7 AFTERTREATMENT DEVICE
8F FRONT AXLE
8R REAR AXLE
9F FRONT TIRE
9R REAR TIRE
10 POWER TAKE-OFF
11 TRANSMISSION
12 CAB
13 FIRST EXHAUST PIPE
14 SECOND EXHAUST PIPE
15 INTAKE PORT
16 INTAKE PORT
17 EXHAUST PORT
18 EXHAUST PORT
19 THIRD EXHAUST PIPE
20 FOURTH EXHAUST PIPE
20M INTERMEDIATE PART
21 INLET
22 OUTLET
23 INLET
24 OUTLET
71 FIRST AFTERTREATMENT DEVICE
72 SECOND AFTERTREATMENT DEVICE
C1 CENTER
C2 CENTER

The invention claimed is:
1. A dump truck comprising:
an engine;
a cab floor disposed above the engine and configured to support a cab;
a first aftertreatment device configured to treat exhaust gas discharged from a first exhaust pipe of the engine;
a second aftertreatment device configured to treat exhaust gas discharged from a second exhaust pipe of the engine,
wherein the first aftertreatment device and the second aftertreatment device are disposed side by side in a vehicle width direction behind the engine and below the cab floor, and a dump body including a protector plate disposed above the cab and a front plate connected to a rear end portion of the protector plate, wherein each of the first aftertreatment device and the second aftertreatment device is disposed in front of the front plate.

2. The dump truck according to claim 1, wherein the first aftertreatment device is disposed such that a longitudinal direction of the first aftertreatment device coincides with the vehicle width direction, and wherein the second aftertreatment device is disposed such that a longitudinal direction of the second aftertreatment device coincides with the vehicle width direction.

3. The dump truck according to claim 1, wherein the first aftertreatment device is disposed on one side in the vehicle width direction of the second aftertreatment device, wherein an exhaust port of the first aftertreatment device is provided at a side portion of the first aftertreatment device on one side in the vehicle width direction, wherein an exhaust port of the second aftertreatment device is provided at a side portion of the second aftertreatment device on another side in the vehicle width direction, wherein the dump truck further comprises:

a third exhaust pipe connected to the exhaust port of the first aftertreatment device; and a fourth exhaust pipe connected to the exhaust port of the second aftertreatment device, and wherein each of an outlet of the third exhaust pipe and an outlet of the fourth exhaust pipe is disposed closer to the one side in the vehicle width direction than to the first aftertreatment device.

4. The dump truck according to claim 3, wherein at least a part of the fourth exhaust pipe is disposed below a center of the first aftertreatment device and a center of the second aftertreatment device in an upward-and-downward direction.

5. The dump truck according to claim 4, wherein the fourth exhaust pipe includes an intermediate part disposed behind the first aftertreatment device and the second aftertreatment device, and wherein the intermediate part of the fourth exhaust pipe is disposed below the center of the first aftertreatment device and the center of the second aftertreatment device in the upward-and-downward direction.

6. The dump truck according to claim 3, wherein a position of the outlet of the third exhaust pipe coincides with a position of at least a part of the outlet of the fourth exhaust pipe in the upward-and-downward direction.

7. The dump truck according to claim 6, wherein the outlet of the third exhaust pipe and the outlet of the fourth exhaust pipe are respectively disposed above the center of the first aftertreatment device and the center of the second aftertreatment device in the upward-and-downward direction.

8. The dump truck according to claim 1, further comprising a vehicle body frame configured to support the engine, wherein each of the first aftertreatment device and the second aftertreatment device is attached to and detached from the vehicle body frame.

9. A dump truck comprising:

an engine;

a cab floor disposed above the engine and configured to support a cab;

a first aftertreatment device configured to treat exhaust gas discharged from a first exhaust pipe of the engine; and a second aftertreatment device configured to treat exhaust gas discharged from a second exhaust pipe of the engine, wherein the first aftertreatment device and the second aftertreatment device are disposed side by side in a vehicle width direction behind the engine and below the cab floor wherein the first aftertreatment device is disposed on one side in the vehicle width direction of the second aftertreatment device, wherein an exhaust port of the first aftertreatment device is provided at a side portion of the first aftertreatment device on one side in the vehicle width direction, wherein an exhaust port of the second aftertreatment device is provided at a side portion of the second aftertreatment device on another side in the vehicle width direction, wherein the dump truck further comprises:

a third exhaust pipe connected to the exhaust port of the first aftertreatment device; and a fourth exhaust pipe connected to the exhaust port of the second aftertreatment device, and wherein each of an outlet of the third exhaust pipe and an outlet of the fourth exhaust pipe is disposed closer to the one side in the vehicle width direction than to the first aftertreatment device.

10. The dump truck according to claim 9, wherein at least a part of the fourth exhaust pipe is disposed below a center of the first aftertreatment device and a center of the second aftertreatment device in an upward-and-downward direction.

11. The dump truck according to claim 10, wherein the fourth exhaust pipe includes an intermediate part disposed behind the first aftertreatment device and the second aftertreatment device, and wherein the intermediate part of the fourth exhaust pipe is disposed below the center of the first aftertreatment device and the center of the second aftertreatment device in the upward-and-downward direction.

12. The dump truck according to claim 9, wherein a position of the outlet of the third exhaust pipe coincides with a position of at least a part of the outlet of the fourth exhaust pipe in the upward-and-downward direction.

13. The dump truck according to claim 12, wherein the outlet of the third exhaust pipe and the outlet of the fourth exhaust pipe are respectively disposed above the center of the first aftertreatment device and the center of the second aftertreatment device in the upward-and-downward direction.

* * * * *